US009219929B2

(12) United States Patent  (10) Patent No.: US 9,219,929 B2
Barnes et al.  (45) Date of Patent: Dec. 22, 2015

(54) ENHANCED STARTUP AND CHANNEL CHANGE FOR FRAGMENTED MEDIA STREAM DELIVERY

(76) Inventors: Fritz Barnes, Alameda, CA (US); Martin Linderoth, Stockholm (SE); Kent Karlsson, Berkeley, CA (US); Emil Pettersson, Obbola (SE); Ola Hallmarker, Stockholm (SE); Anders Odlund, San Francisco, CA (US)

( * ) Notice: Subject to any disclaimer, the term of this patent is extended or adjusted under 35 U.S.C. 154(b) by 108 days.

(21) Appl. No.: 13/405,824

(22) Filed: Feb. 27, 2012

(65) Prior Publication Data

US 2013/0227075 A1  Aug. 29, 2013

(51) Int. Cl.
| G06F 15/16 | (2006.01) |
| H04N 21/234 | (2011.01) |
| H04N 21/845 | (2011.01) |
| H04N 21/854 | (2011.01) |
| H04N 21/262 | (2011.01) |
| H04N 21/482 | (2011.01) |

(52) U.S. Cl.
CPC ... H04N 21/23412 (2013.01); H04N 21/26258 (2013.01); H04N 21/845 (2013.01); H04N 21/85406 (2013.01); H04N 21/26233 (2013.01); H04N 21/4825 (2013.01)

(58) Field of Classification Search
CPC .............. H04N 21/23412; H04N 21/26233; H04N 21/26258; H04N 21/845; H04N 21/4825; H04N 21/85406
USPC .................................................. 709/219, 231
See application file for complete search history.

(56) References Cited

U.S. PATENT DOCUMENTS

| 8,085,843 | B2 * | 12/2011 | Kim ......................... 375/240.12 |
| 2002/0168175 | A1 * | 11/2002 | Green et al. .................... 386/68 |
| 2003/0188182 | A1 * | 10/2003 | Sato et al. ...................... 713/193 |
| 2006/0291798 | A1 * | 12/2006 | Suneya ........................... 386/52 |
| 2007/0053658 | A1 * | 3/2007 | Murakami et al. .............. 386/95 |
| 2008/0127245 | A1 * | 5/2008 | Olds .................................. 725/32 |
| 2008/0165847 | A1 * | 7/2008 | Kim ......................... 375/240.12 |
| 2009/0208119 | A1 * | 8/2009 | Lee et al. ...................... 382/232 |
| 2010/0034508 | A1 * | 2/2010 | Morimoto et al. .............. 386/52 |
| 2010/0153395 | A1 * | 6/2010 | Hannuksela et al. ......... 707/737 |
| 2011/0093617 | A1 * | 4/2011 | Igarashi ........................ 709/246 |
| 2011/0314174 | A1 * | 12/2011 | Joung et al. ................... 709/231 |
| 2012/0002947 | A1 * | 1/2012 | Rhyu et al. .................... 386/248 |
| 2012/0174142 | A1 * | 7/2012 | Kokernak et al. ................. 725/9 |
| 2012/0221741 | A1 * | 8/2012 | Frojdh et al. .................. 709/231 |
| 2013/0046861 | A1 * | 2/2013 | Biderman et al. ............. 709/219 |
| 2013/0117413 | A1 * | 5/2013 | Kaneko et al. ................ 709/217 |
| 2013/0132579 | A1 * | 5/2013 | Keum et al. ................... 709/225 |
| 2013/0136190 | A1 * | 5/2013 | Hallmarker et al. ..... 375/240.26 |

(Continued)

OTHER PUBLICATIONS

International Standard, ISO/IEC 14496-12, second edition Apr. 1, 2005 corrected version Oct. 1, 2005, pp. 1-95.*

*Primary Examiner* — Oleg Survillo
(74) *Attorney, Agent, or Firm* — Kwan & Olynick LLP

(57) ABSTRACT

A media stream delivery system encodes and fragments media streams into numerous media stream fragments maintained on fragment servers. Playlist information, media data, and bandwidth adaption data is provided as box information with media stream fragments to reduce the number of client requests required to begin playback or perform a channel change. A client no longer needs to make separate requests for bandwidth adaptation data, media data, or playlist information. Playback can begin as soon as sufficient media stream fragments are received.

16 Claims, 5 Drawing Sheets

(56) References Cited

U.S. PATENT DOCUMENTS

| | | | |
|---|---|---|---|
| 2013/0147914 A1* | 6/2013 | Park et al. | 348/43 |
| 2013/0208087 A1* | 8/2013 | Lee et al. | 348/43 |
| 2013/0219182 A1* | 8/2013 | Barnes et al. | 713/176 |
| 2014/0126364 A1* | 5/2014 | Stanwood et al. | 370/230 |

\* cited by examiner ns of the present invention will sometimes describe a
ENHANCED STARTUP AND CHANNEL CHANGE FOR FRAGMENTED MEDIA STREAM DELIVERY

TECHNICAL FIELD

The present disclosure relates to enhanced startup and channel change for fragment media stream delivery.

DESCRIPTION OF RELATED ART

Media streams typically involve encoding or re-encoding prior to transmission to devices and users associated with the devices. In many instances, media streams are encoded into a format such as MPEG-4 Part 10 or MPEG-4 Part 12. The encoding servers may have the capacity to perform real-time live encoding on up to half a dozen media streams simultaneously. Client devices must request the media streams from the servers and performing decoding for playback. A wide variety of activities typically must occur prior to beginning video playback of a media stream on a device.

Conventional mechanisms involve delay prior to playback of fragmented media streams. Consequently, the techniques of the present invention provide improved mechanisms for startup and channel change for fragmented media streams to reduce delay and improve user experience.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
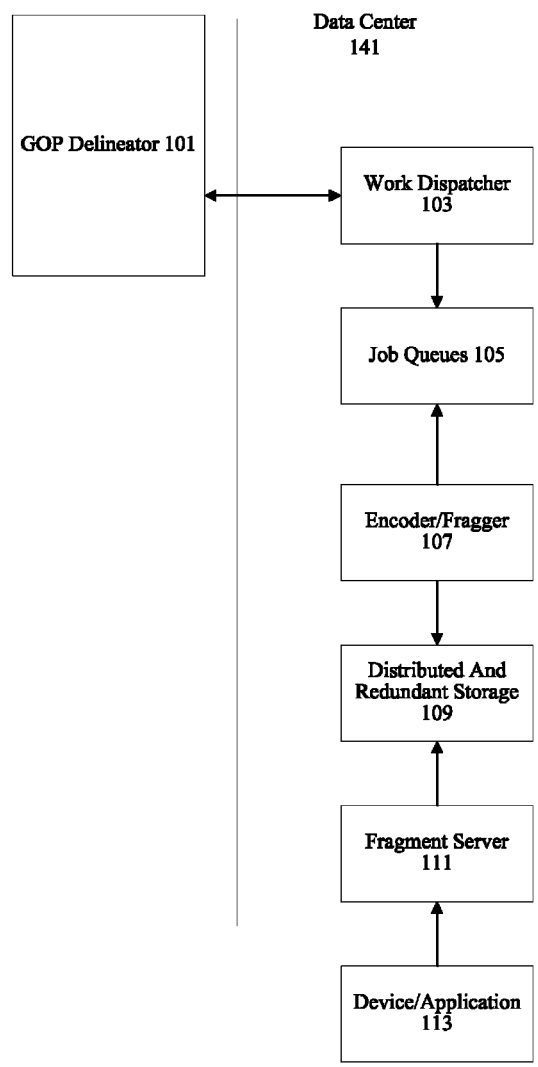
FIG. 1 illustrates one example of a distributed encoding system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragment servers. However, it should be noted that the techniques of the present invention may also apply to fragment server variations and media stream servers. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A media stream delivery system encodes and fragments media streams into numerous media stream fragments maintained on fragment servers. Playlist information, media data, and bandwidth adaption data is provided as box information with media stream fragments to reduce the number of client requests required to begin playback or perform a channel change. A client no longer needs to make separate requests for bandwidth adaptation data, media data, or playlist information. Playback can begin as soon as sufficient media stream fragments are received.

Example Embodiments

A variety of transactions must occur prior to delivery of media streams to devices. A device typically performs a three way handshake with a content server. The device then requests playlist information and receives playlist information, request media data and receives media data, and optionally requests bandwidth adaptation information and receives bandwidth adaptation information. Furthermore, conventional MPEG-4 files require that a player on a device parse the entire header before any of the data can be decoded. Some systems require decoding of an audio portion prior to playback of a video portion. Parsing the entire header or decoding an entire audio portion can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be intelligent encoded in a distributed architecture on dynamically scalable hardware, recorded, and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

According to various embodiments, box information in a box structure provides information sufficient to respond to conventional playlist information, media data, and bandwidth adaptation requests. No separate requests for this information are required.

MPEG-4 fragments may be maintained on fragment servers. Devices request fragments from the fragment server in order to reconstruct particular media streams for playback. In some examples, fragments correspond to a particular live stream variant that is reconstructed as additional fragments are made available.

According to various embodiments, MPEG-4 fragment distribution technology is provided so that a client device only needs HTTP round trip time (RTT) before the client is receiving audio/video data that can be submitted to decoders/renders. In particular embodiments, MPEG-4 fragment generators interleave audio and video when creating fragments so that audio/video content is multiplexed. The client device does not have to receive all of the audio data before it can begin playing the video data. According to various embodiments, a client device estimates the bandwidth of the connection being used to connected to the server. If sufficient bandwidth exists so that the client will download the fragment faster than the length of the fragment, the client can begin queuing samples for playback. Lower initial bandwidths can be streamed to fill the initial pipeline before switching to higher resolution. This allows buffers to be filled quickly and the client can therefore handle changing network conditions.

FIG. 1 illustrates one example of a system for performing fragmentation and media stream delivery. According to various embodiments, a media stream is received from a content provider source such as a satellite. In particular embodiments, the media stream is provided in an MPEG-2 format. The media stream is delineated into Groups of Pictures (GOPs) using a GOP delineator 101. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidirectionally predictive coded frames contain different information indicating distinctions from a reference frame such as a key frame or another predictive frame.

After the media stream is delineated into GOPs, a work dispatcher 103 is notified that a GOP is available. According to various embodiments, the work dispatcher 103 determines if it is the one assigned to work on it as well as what should be done with the GOP. According to various embodiments, the work dispatcher may determine that the GOP should be encoded into 8 different variants. In particular embodiments, the work dispatcher 103 creates a description of what needs to be done, assigns a weight or priority level to the job, and sends the job to job queues 105. According to various embodiments, job queues are first in first out (FIFO) queues that are empty most of the time. Encoders/fraggers 107 request jobs and obtain them from the job queues 105. According to various embodiments, jobs may be ordered in a job queue based on weight. In particular embodiments, encoders/fraggers 107 may select higher priority jobs first from the job queues.

In particular embodiments, different priority jobs are placed in different priority job queues. Multiple jobs may be taken from the higher priority job queues before a single job is taken from the lower priority job queues. According to various embodiments, highest priority jobs are processed before lower priority jobs. In particular embodiments, queues are assigned percentage of service values. A high priority queue may get serviced 40% of the time. A medium priority queue 30% of the time, and the remaining queues 20% and 10% of the time by the encoders/fraggers. According to various embodiments, hundreds or thousands of encoders/fraggers reside in a system. In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 107 is a virtual machine that may reside on one or more physical servers that may or may not have specialized encoding hardware. In particular embodiments, a cloud service determines how many of these virtual machines to use based on established thresholds.

According to various embodiments, a unique identifier is provided for each GOP and a log of each step is maintained. After the encoder/fragger 107 completes processing a job and outputs an encoded fragment, the encoded fragment is maintained in distributed and redundant storage 109. In one example, distributed and redundant storage 109 is a virtualized scale out network attached storage system. The distributed and redundant storage 109 allows a system to maintain numerous fragments on any number of virtualized storage devices.

According to various embodiments, fragments on distributed and redundant storage 109 are accessible by fragment server 111. The fragment server 111 provides the caching layer with fragments for clients. The design philosophy behind the client/server API minimizes round trips and reduces complexity as much as possible when it comes to delivery of the media data to a client device. The fragment server 111 provides live streams and/or DVR configurations.

According to various embodiments, a client device uses a media component that requests fragmented MPEG-4 files, allows trick-play, and manages bandwidth adaptation. In particular embodiments, bandwidth adaptation information, playlist information, and media data is included in a box structure generated by the box structure generated by encoder/fragger 107. In particular embodiments, a device/application 113 on a client device performs a transport control protocol 3-way handshake with the fragment server 111 to initiate a connection to receive a media stream. According to various embodiments, instead of the device/application 113 requesting bandwidth adaption information, playlist information, and media data in separate transactions from the fragment server 111, the bandwidth adaptation information, playlist information, and media data may be embedded in a box structure provided with the media stream fragments by the fragment server. In some examples, the box structure may be provided with first fragment.

Figure 2:
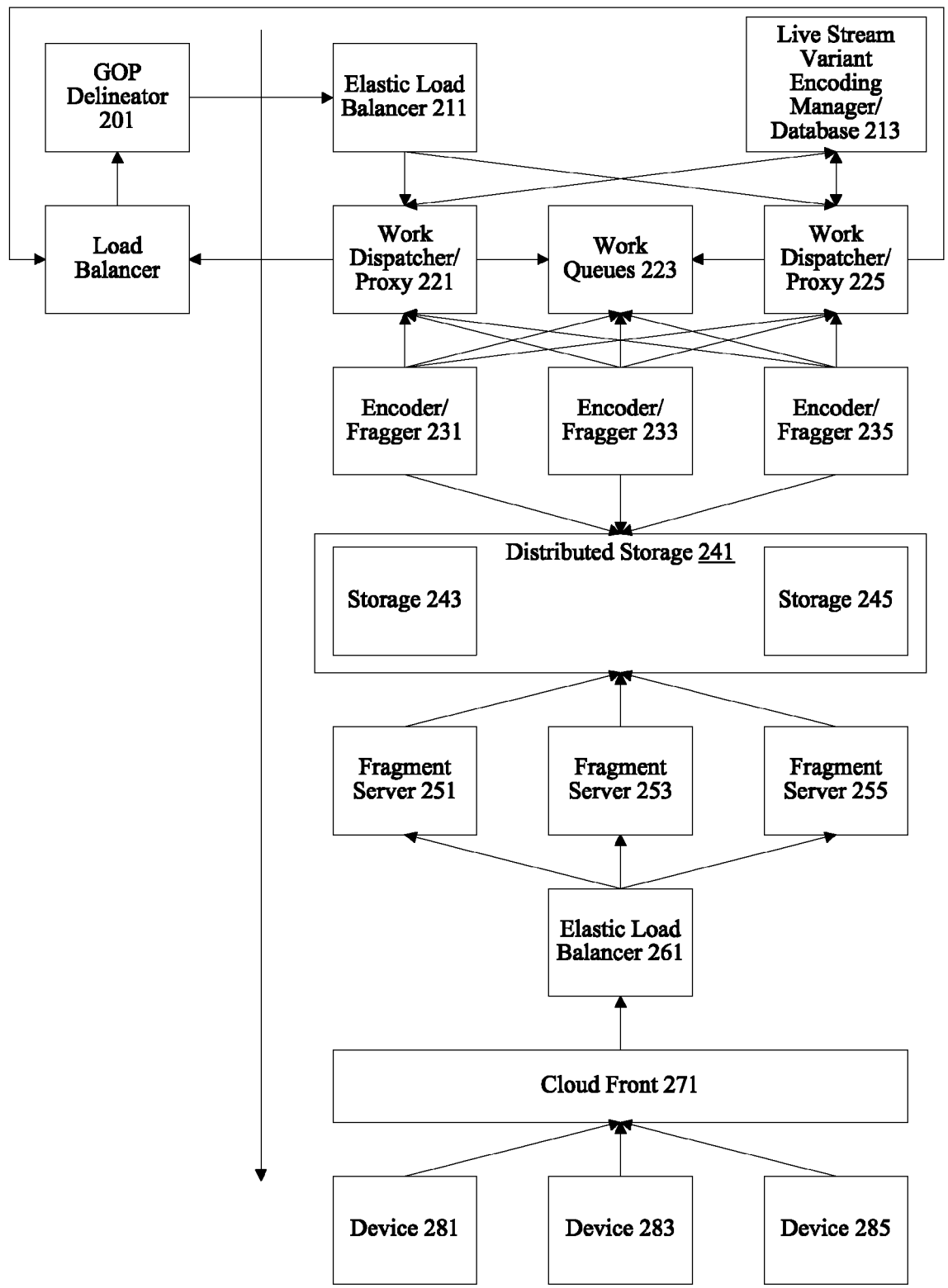
FIG. 2 illustrates one example of a mechanism for implementing distributed encoding redundancy with live stream variant monitoring.

FIG. 2 illustrates one example of a distributed, scalable encoding system that provides for enhanced connections and channel changes. According to various embodiments, a media stream is received from a content provider source such as a satellite. In particular embodiments, the media stream is provided in an MPEG-2 format. The media stream is delineated into Groups of Pictures (GOPs) using a GOP delineator 201. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidirectionally predictive coded frames contain different information indicating distinctions from a reference frame such as a key frame or another predictive frame. According to various embodiments, multiple GOP delineators 201 are active simultaneously. If a GOP delineator fails, other GOP delineators are available and all GOP delineators can send out notifications.

After the media stream is delineated into GOPs, an elastic load balancer 211 is used to distribute work to work dispatchers 221 and 225. According to various embodiments, a live stream variant encoding manager 213 monitors live stream variant consumption. If particular variant are not being consumed, jobs for creating those variants are no longer performed. If particular not yet available variants are requested, then jobs creating those variants can be generated by the work dispatcher 225 at the request of the live stream variant encoding manager 213. If a work dispatcher fails right as it takes a notification, another notification occurs to a different work dispatcher. Two notifications for the same GOP will end up on two different machines. At each work dispatcher 221 and 225, there may also be a proxy. According to various embodiments, the GOP delineator 201 resides on a different data center than the work dispatchers 221 and 225. Using proxies at work dispatchers 221 and 225 allows for a single transfer of a media stream GOP between data centers.

According to various embodiments, the work dispatchers 221 and 225 determine characteristics of a particular job and what should be done with the GOP. According to various embodiments, the work dispatchers 221 and 225 may determine that the GOP should be encoded into 8 different variants. In particular embodiments, the work dispatchers 221 and 225 create descriptions of what needs to be done and send jobs to job queues 223. According to various embodiments, job queues 223 include an active job queue and a standby job queue. According to various embodiments, job queues are first in first out (FIFO) queues that are empty most of the time. Timeouts may be associated with each job in the queue. Encoders/fraggers 231, 233, and 235 request jobs and obtain them from the job queues 223. In particular embodiments, encoders/fraggers 231, 233, and 235 are identical and can be dynamically activated or deactivated. According to various embodiments, hundreds or thousands of encoders/fraggers reside in a system.

In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoder/fragger 231, 233, and 235 is a virtual machine that may reside on one or more physical servers that may or may not have specialized encoding hardware. In particular embodiments, a cloud service determines how many of these virtual machines to use based on established thresholds.

According to various embodiments, encoders/fraggers 231, 233, and 235 are stateless. According to various embodiments, a unique identifier is provided for each GOP and a log of each step is maintained. If a particular encoder/fragger fails at any point in the process, another encoder/fragger can perform encoding and fragmentation operations. After the encoders/fraggers 231, 233, and 235 complete the jobs and generate encoded fragments, the encoded fragments are maintained in distributed and redundant storage 241. In one example, distributed and redundant storage 241 is a virtualized scale out network attached storage system. The distributed and redundant storage 241 includes nodes 243 and 245, allowing a system to maintain numerous fragments on any number of virtualized storage devices.

According to various embodiments, fragments on distributed and redundant storage 241 are accessible by fragment servers 251, 253, and 255. The fragment servers 251, 253, and 255 provide a caching layer with fragments for clients. The design philosophy behind the client/server API minimizes round trips and reduces complexity as much as possible when it comes to delivery of the media data to a client device. The fragment servers 251, 253, and 255 provide live streams and/or DVR configurations. According to various embodiments, fragment servers also operate without state. In particular embodiments, fragments servers operate using HTTP get requests. According to various embodiments, each process allows a flow to continue without having a centralized control point. An elastic load balancer 261 distributes fragment requests from a cloud front 271 provided to devices 281, 283, and 285. According to various embodiments, devices 281, 283, and 285 monitor and analyze media streams to determine what fragments should be cached. In some examples, devices 281, 283, and 285 cache any fragment that has been determined to be redundant to any fragment previously requested. Fragments can be compared using identifiers, hashes, etc.

According to various embodiments, a client device uses a media component that requests fragmented MPEG-4 files, allows trick-play, and manages bandwidth adaptation. In particular embodiments, bandwidth adaptation information, playlist information, and media data is included in a box structure generated by the box structure generated by encoder/fraggers 231, 233, and 235. In particular embodiments, a device/application 281, 283, and/or 285 perform a transport control protocol 3-way handshake with fragment servers 251, 253, and/or 255 to initiate a connection to receive a media stream. According to various embodiments, instead of the device/application 281, 283, or 285 requesting bandwidth adaption information, playlist information, and media data in separate transactions from the fragment servers 251, 253, and/or 255 the bandwidth adaptation information, playlist information, and media data may be embedded in a box structure provided with the media stream fragments by the fragment server. In some examples, the box structure may be provided with first fragment.

Figure 3:
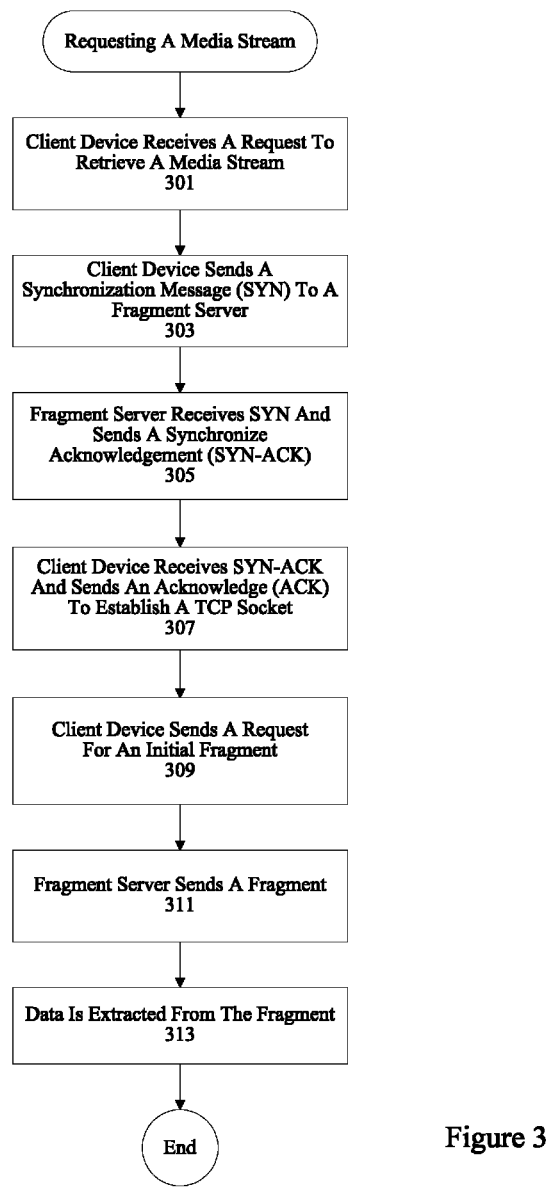
FIG. 3 illustrates a technique for requesting a media stream.

FIG. 3 illustrates one example of a technique for requesting a media stream. At 301, a client device or application receives a request to retrieve a media stream. The request may correspond to startup or channel change. In particular embodiments, the media stream may be a live media stream, pre-recorded content, an advertisement, etc. According to various embodiments, the client device may be a mobile device, set top box, video receiver, etc. The client device performs a three way handshake to initialize a transport control protocol socket. The three way handshake may include a synchronization message (SYN) sent from the client to a fragment server at 303. The fragment server receives the SYN message and sends a synchronize acknowledgement (SYN-ACK) at

305. The client device then responds with an acknowledge (ACK) upon receiving the SYN-ACK at 307 to establish the TCP socket.

According to various embodiments, a client device then requests media data, playlist information, and bandwidth adaptation information from the server. Each of these requests may entail as separate HTTP request and response. The client device then requests the actual media stream. In particular embodiments, all audio must be received prior to playback. However, the techniques of the present invention provide a media stream box structure that includes playlist information, media data, and bandwidth adaptation information. Instead of making separate requests prior to obtaining an initial fragment, the box structure may be provided in one or more initial fragments. According to various embodiments, the client device requests an initial fragment at 309. The fragment server responds with a fragment including box information at 311. The fragment may include multiplexed video and audio along with playlist, media data, and bandwidth adaptation that is extracted at 313. In particular embodiments, the quality of the video and audio in the initial fragment is reduced to accommodate additional playlist, media data, and bandwidth adaptation data.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

Figure 4:
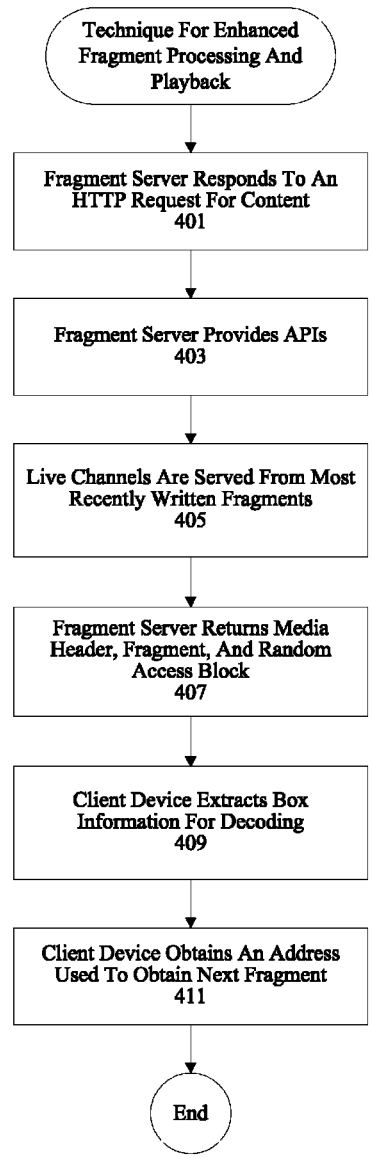
FIG. 4 illustrates a technique for enhanced fragment processing.

FIG. 4 illustrates one example of a technique for enhanced fragment processing and playback. According to various embodiments, the fragment server responds to an HTTP request for content at 401. According to various embodiments, the fragment server provides APIs that can be used by clients to get necessary headers required to decode the video, seek to any desired time frame within the fragment and APIs to watch channels live using box information at 403. In particular embodiments, live channels are served from the most recently written fragments for the show on that channel at 405. The fragment server returns the media header (necessary for initializing decoders), a particular fragment, and the random access block to clients at 407. According to various embodiments, the APIs supported allow for optimization where the metadata header information associated with box information is returned to the client along with the first fragment. The client device extracts the box information that may include media data, bandwidth adaptation information, playlist information, and video and audio for decoding at 409. The fragment writer creates a series of fragments within the file. According to various embodiments, the client device also obtains from the response an address used to obtain the next fragment at 411.

According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MPEG-4 file has a sequence number. Using this knowledge and a well defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each fragment contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bitrate.

Because each request to the server looks like a request to a separate file, the response to requests can be cached in any HTTP Proxy, or be distributed over any HTTP based CDN.

Figure 5:
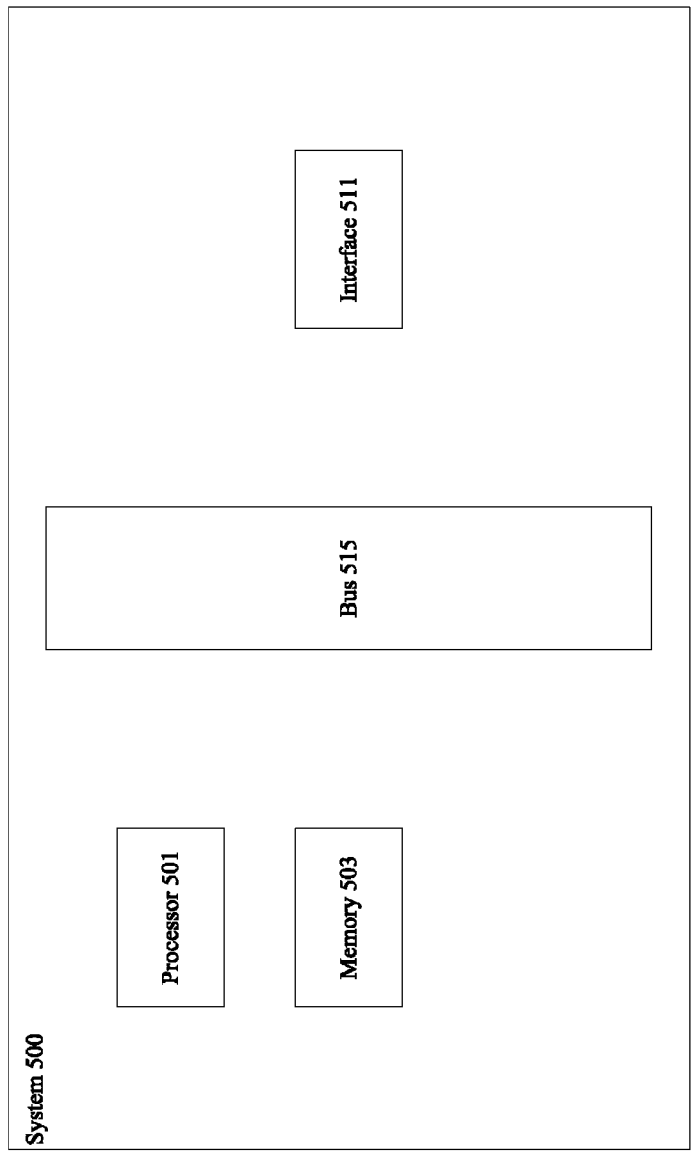
FIG. 5 illustrates one example of a system.

FIG. 5 illustrates one example of a computer system. According to particular embodiments, a system 500 suitable for implementing particular embodiments of the present invention includes a processor 501, a memory 503, an interface 511, and a bus 515 (e.g., a PCI bus or other interconnection fabric) and operates as a streaming server. When acting under the control of appropriate software or firmware, the processor 501 is responsible for modifying and transmitting live media data to a client. Various specially configured devices can also be used in place of a processor 501 or in addition to processor 501. The interface 511 is typically configured to send and receive data packets or data fragments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 500 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
sending a request from a client to a content server for a media stream comprising a plurality of fragments;
receiving the plurality of fragments, including a first fragment, each of the plurality of fragments comprising encoded audio and video data and the first fragment further including box information, the box information comprising playlist information, bandwidth adaptation data, and media data corresponding to the media stream, the playlist information including a playlist,
wherein quality of the encoded audio and video data contained in the first fragment is reduced to accommodate the box information,
wherein the plurality of fragments, including the box information, are received without the client sending a separate bandwidth adaption data request, a separate playlist information request, or a separate media data request to the server;
extracting the box information from the first fragment; and
beginning playback after sufficient number of fragments is received to decode video and audio data.

2. The method of claim 1, wherein the media stream is a fragmented MPEG-4 (FMP4) media stream.

3. The method of claim 1, wherein the plurality of fragments are a plurality of segments.

4. The method of claim 1, wherein the client is a mobile device.

5. The method of claim 1, wherein the server is an FMP4 server.

6. The method of claim 1, wherein audio and video data is multiplexed in the media stream so that the client can begin playback of video data before receiving all of the audio data.

7. The method of claim 1, wherein the media stream is a live media stream.

8. The method of claim 1, wherein the client estimates the bandwidth of the connection to the server.

9. A system, comprising:
an interface configured to send a request from a client to a content server for a media stream comprising a plurality of fragments;
the interface further configured to receive the plurality of fragments, including a first fragment, each of the plurality of fragments comprising encoded audio and video data and the first fragment further including box information, the box information comprising playlist information,. bandwidth adaptation data, and media data corresponding to the media stream, the playlist information including a playlist,
wherein quality of the encoded audio and video data contained in the first fragment is reduced to accommodate the box information,
wherein the plurality of fragments, including the box information, are received without the client sending a separate bandwidth adaption data request, a separate playlist information request, or a separate media data request to the server; and
a computer processor configured to extract the box information from the first fragment, wherein playback begins after sufficient number of fragments is received to decode video and audio data.

10. The system of claim 9, wherein the media stream is a fragmented MPEG-4 (FMP4) media stream.

11. The system of claim 9, wherein the plurality of fragments are a plurality of segments.

12. The system of claim 9, wherein the client is a mobile device.

13. The system of claim 9, wherein the server is an FMP4 server.

14. The system of claim 9, wherein audio and video data is multiplexed in the media stream so that the client can begin playback of video data before receiving all of the audio data.

15. The system of claim 9, wherein the media stream is a live media stream.

16. The system of claim 9, wherein the client estimates the bandwidth of the connection to the server.

* * * * *